(12) United States Patent
Sun et al.

(10) Patent No.: US 9,235,939 B2
(45) Date of Patent: Jan. 12, 2016

(54) DRIVER RECORDING APPARATUS

(75) Inventors: Bo Sun, Rochester Hills, MI (US); Hisanori Miura, West Bloomfield, MI (US); Hiroshi Hattori, Bloomfield Hills, MI (US)

(73) Assignee: Denso International America, Inc., Southfield, MI (US)

( * ) Notice: Subject to any disclaimer, the term of this patent is extended or adjusted under 35 U.S.C. 154(b) by 970 days.

(21) Appl. No.: 13/041,494

(22) Filed: Mar. 7, 2011

(65) Prior Publication Data

US 2012/0232740 A1    Sep. 13, 2012

(51) Int. Cl.
| | |
|---|---|
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |
| G07C 5/08 | (2006.01) |
| G06F 11/07 | (2006.01) |

(52) U.S. Cl.
CPC ............ G07C 5/085 (2013.01); *G06F 11/0739* (2013.01); *G06F 11/0748* (2013.01); *G06F 11/0787* (2013.01); *G07C 5/008* (2013.01); *G07C 2205/02* (2013.01)

(58) Field of Classification Search
CPC ........... G07F 5/008; G07F 5/085; G06F 7/00; G06F 11/0739; G06F 11/0748; G06F 11/0787; G07C 5/085; G07C 5/088; G07C 2205/02
USPC ................................................ 701/29.1, 32.2
IPC ........................... G07F 5/008, 5/085; G06F 7/00
See application file for complete search history.

(56) References Cited

U.S. PATENT DOCUMENTS

| | | | |
|---|---|---|---|
| 6,076,026 A | 6/2000 | Jambhekar et al. | |
| 6,185,490 B1 | 2/2001 | Ferguson | |
| 7,957,862 B2 * | 6/2011 | Kaita et al. | 701/34.3 |
| 8,081,643 B2 * | 12/2011 | Sonoda et al. | 370/401 |

(Continued)

FOREIGN PATENT DOCUMENTS

| | | |
|---|---|---|
| JP | 2001-222731 | 8/2001 |
| JP | 2004-038388 | 2/2004 |

(Continued)

OTHER PUBLICATIONS

English_translation_for_Reference_JP_2005178449A.*

(Continued)

*Primary Examiner* — Jason Holloway
*Assistant Examiner* — Rachid Bendidi
(74) *Attorney, Agent, or Firm* — Harness, Dickey & Pierce, P.L.C.

(57) ABSTRACT

In order to make it more difficult to alter the recorded data in an event data recorder, a plurality of electric control devices may each have a memory device and may each play a respective role in the vehicle. A data assignment device may be connected to the plurality of electric control devices and the data assignment device may assign a part of drive record data to one of the plurality of electric control devices to store the part of drive record data. The data assignment device may also assign the rest of the drive record data to the rest of the plurality of electric control devices to store the rest of the drive record data.

19 Claims, 3 Drawing Sheets

(56) References Cited

U.S. PATENT DOCUMENTS

| | | | |
|---|---|---|---|
| 2007/0135980 A1* | 6/2007 | Plante | 701/35 |
| 2008/0208533 A1* | 8/2008 | Yokogawa | 702/183 |
| 2008/0258885 A1* | 10/2008 | Akhan | 340/425.5 |
| 2009/0058995 A1* | 3/2009 | Yamashita | 348/61 |
| 2009/0262000 A1* | 10/2009 | Kanazawa et al. | 341/176 |
| 2010/0023207 A1* | 1/2010 | Maeda et al. | 701/35 |
| 2010/0201819 A1* | 8/2010 | Minowa | 348/148 |
| 2011/0304447 A1* | 12/2011 | Marumoto | 340/438 |

FOREIGN PATENT DOCUMENTS

| | | |
|---|---|---|
| JP | 2004-126716 | 4/2004 |
| JP | 2004-338607 | 12/2004 |
| JP | 2005-178449 | 7/2005 |
| JP | 2005178449 A * | 7/2005 |
| JP | 2009-181339 | 8/2009 |

OTHER PUBLICATIONS

Office Action issued Dec. 24, 2014 in corresponding JP Application No. 2011-280194 (with English translation).

* cited by examiner

DRIVER RECORDING APPARATUS

FIELD

The present disclosure relates to an event data recorder for a vehicle.

BACKGROUND

This section provides background information related to the present disclosure, which is not necessarily prior art. Pre-crash and post-crash vehicle drive record data, generally known as drive record data, may be recorded by an event data recorder (EDR). Such drive record data is often used to reconstruct the scene of an accident, such as an accident involving one or more vehicles. Data stored in an EDR may be used as evidence in a court of law or may be inquired by an insurance company to compile crash or event data. Thus, the public availability of the drive record data is one of many important functions of an EDR. If it were possible to alter the drive record data recorded in an EDR easily, the reliability of the drive record data may be compromised. Thus, ensuring the integrity of data within an event data recorder may be important to various entities.

SUMMARY

In order to make it more difficult to alter recorded drive record data in an EDR, the present disclosure describes a plurality of electric control devices, which each have a memory device. The plurality of electric control devices may each play a respective different role in a vehicle, and a data assignment device may be connected to the plurality of electric control devices. A data assignment device may assign a part of drive record data to one of the plurality of electric control devices to store a portion of drive record data. The data assignment device may also assign drive record data to the rest of the plurality of electric control devices to store the rest or balance of any drive record data.

With the above structure, if someone desires or tries to alter the recorded data, he or she would have to detect which electric control device actually stores the specific data intended or desired to be altered, or to set all of the electric control devices available to access (e.g. an access mode), and then input completely new accident data into memory.

In either case mentioned above, detection of a specific data location (e.g. in memory) or the input of new accident data would be very difficult for an ordinary person. Thus, with the above structure, altering recorded data is much more difficult relative to a conventional EDR, which stores drive record data in its entirety, in one device, such as in one memory device or in one location. Another aspect of this disclosure may permit conversion of drive record data into mathematical data when drive record data is desired to be stored in electric control devices. Still yet, electric control devices may be disposed in different positions and in different locations within the vehicle.

In another configuration, an event data recording and loading system for a vehicle may employ a plurality of electric control devices disposed in different positions in the vehicle, the plurality of electric control devices each having a non-volatile memory device and each playing a respective role in the vehicle. A data assignment device may be connected to the plurality of electric control devices, and a data loading device may be enabled to communicate with the data assignment device. The data assignment device may assigns a part of drive record data to one of the plurality of electric control devices to store the part of drive record data, the data assignment device may also assign the rest of the drive record data to the rest of the plurality of electric control devices to store the rest of the drive record data, and the data loading device may be a portable device and collect fractions of the drive record data from the plurality of the electric control devices and combines said fractions to restore the drive record data. The drive record data may be converted into mathematical data when stored in the electrical control devices, and the data loading device may convert the mathematical data into available drive record data.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding elements throughout the several views of the drawings.

DETAILED DESCRIPTION

Figure 1:
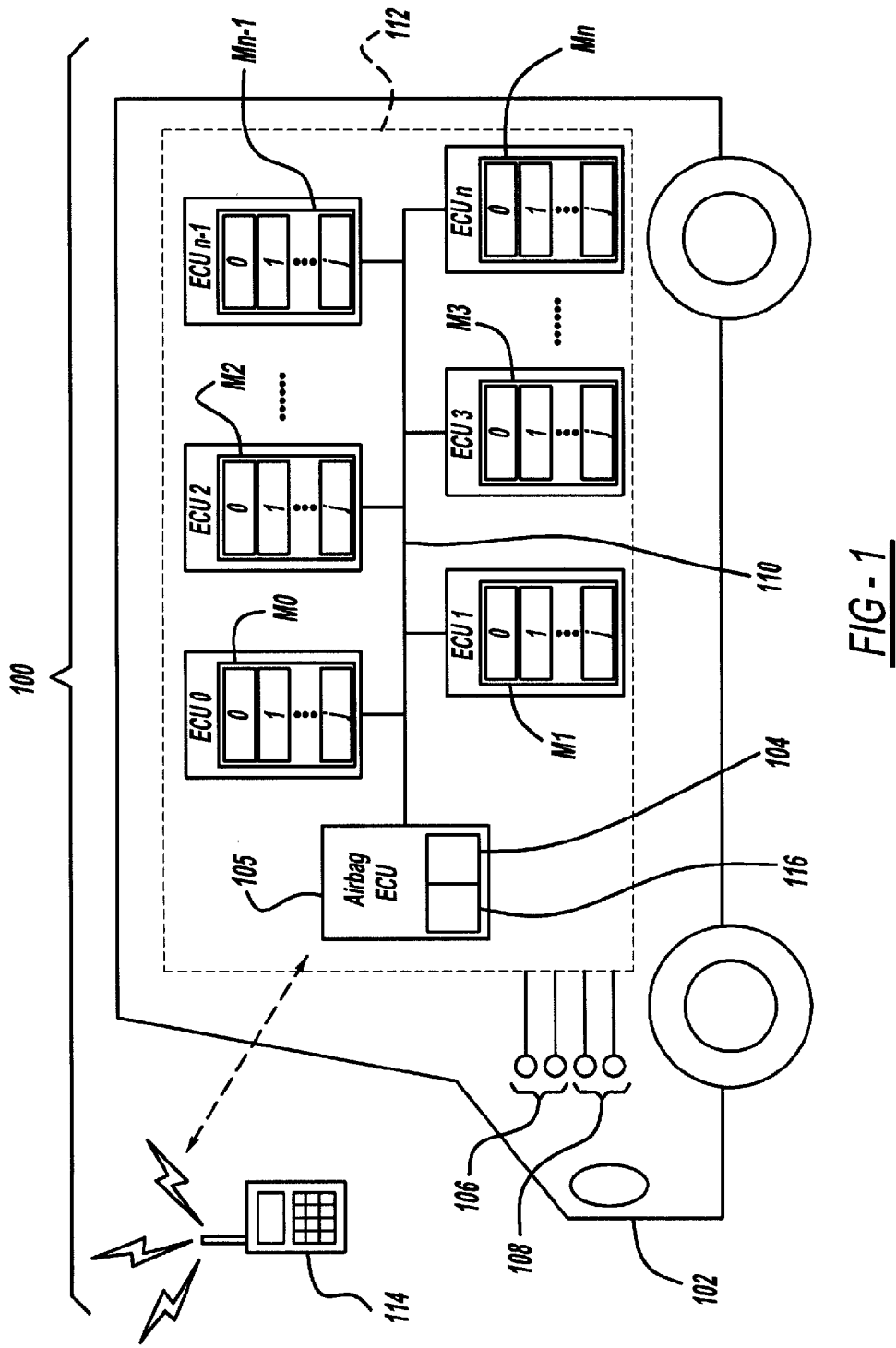
FIG. 1 is a schematic view of an event data recording and loading system for a vehicle in accordance with the present disclosure.

The preferred embodiments will now be described more fully with reference to FIGS. 1-3 of the accompanying drawings. FIG. 1 is a schematic view depicting an event data recording and loading system 100 for a vehicle 102.

The event data recording and loading system 100 may comprise an event data recorder 112 and a data loading device 114. The event data recorder 112 may comprise a plurality of electric control devices ECU0-ECUn and a data assignment device 104 connected to the plurality of electric control devices ECU0-ECUn. The plurality of electric control devices ECU0-ECUn and the data assignment device 104 may communicate via a bus bar to establish a vehicle network 110. Each of the plurality of electric control devices ECU0-ECUn plays a respective role in the vehicle and may be disposed in a different position in the vehicle.

In one example, ECU0 may be in charge of engine control, ECU1 may be in charge of braking, ECU2 may be in charge of air conditioning, and ECU3 may be in charge of battery charging. Electric control devices ECU0-ECUn each may have respective memory devices M1-Mn. The memory devices M1-Mn may be rewritable non-volatile memory, such as erasable programmable read only memory (EPROM), flash memory, magnetic memory or Magnetoresistive Random Access Memory (MRAM). Each memory device, M1-Mn, may have multiple memory blocks, such as 0-j.

An Airbag ECU 105 may provide a data assignment device 104 as a part of its function. Data assignment device 104 may receive drive record data from other ECUs, sensors 106 or switches 108, and subsequently assign the drive record data to one or more electric control devices ECU0-ECUn.

The drive record data includes at least one of longitudinal delta-V during the collision event, pre-collision vehicle speed, distance between subject vehicle and front object detected by a front radar of the vehicle, engine throttle percentage, braking activity prior to the collision, driver seat belt usage, engine cycle count at the time of the collision, and the number of collision events. The delta-V indicates the difference of the vehicle velocity per a unit time period. This drive record data may be input to the vehicle network via vehicle sensors 106 and switches 108, or calculated by the electric control devices.

Data assignment device 104 assigns a part of the drive record data to one of the electric control devices ECU0 and distributes the assigned drive data to the electric control devices ECU0, and the data assignment device 104 asks one of the electric control devices (e.g. ECU0 or another) to store the assigned drive record data. Then, data assignment device 104 also assigns the rest of the drive record data to the rest of the plurality of electric control devices ECU1-ECUn, and data assignment device 104 asks the rest of the plurality of electric control devices ECU1-ECUn to store the rest of the drive record data.

In this embodiment, data assignment device 104 starts assigning and distributing the drive record data from memory block0 of ECU0, and when memory0 of ECU0 become full, data assignment device 104 starts assigning and distributing the drive record data to the next memory block0 of ECU1.

In this embodiment, data assignment device 104 divides the drive record data into several fractions while distributing the drive record data to electric control devices ECU1-ECUn in a predetermined numbering order; however, the present disclosure is not limited to such a distributing method. For instance, data assignment device 104 may divide the drive record data into several fractions prior to the start of the distribution of the drive data, and then distribute the fractions to electric control devices ECU1-ECUn.

Also, in this embodiment, data assignment device 104 receives the drive record data from other ECUs, but as far as the drive record data can be assigned to the multiple electric control devices ECU1-ECUn, data assignment device 154 does not have to receive the drive record data as they are. For example, the total data quantity of the drive record data may be enough for data assignment device 104 to assign the drive record data to the plurality of electric control devices ECU1-ECUn. Assignment may include all available electric control devices ECU1-ECUn.

The longitudinal delta-V, and pre-collision vehicle speed data are recorded even if a vehicle engine is not running, if the main switch of the vehicle was turned to the "ON" position. The main switch may be an ignition switch for the internal combustion engine or an accessory switch. Vehicle braking activity may be recorded in half second intervals or smaller time intervals for at least 5 seconds prior to a collision. If there are two collisions, the drive record data may also contain the time interval between the two collisions. The drive record data may contain a flag indicating if the drive record data has already been downloaded, or a number indicating how many times the drive record data has been download.

Memory devices M1-Mn in electric control devices ECU0-ECUn may be protected from writing when not connected to vehicle network 110 or data assignment device 104. Data loading device 114 is able to communicate with the vehicle network 110 via a means for communicating, such as a wireless communication protocol or a wire connection. Data loading device 114 may be intended to be used by the person who wants to load the drive record data. Data loading device 114 may collect the distributed fractions of the drive record data from the plurality of the electric control devices ECU1-ECUn and combine the same to reconstruct the scene of the accident. In this embodiment, data loading device 114 may combine the fractions of the drive record data based on the time stamp of each of the fractions, but if the data assignment device can memorize its assignment history, data loading device 114 may combine the fractions of the drive record data based on the assignment history.

Figure 2:
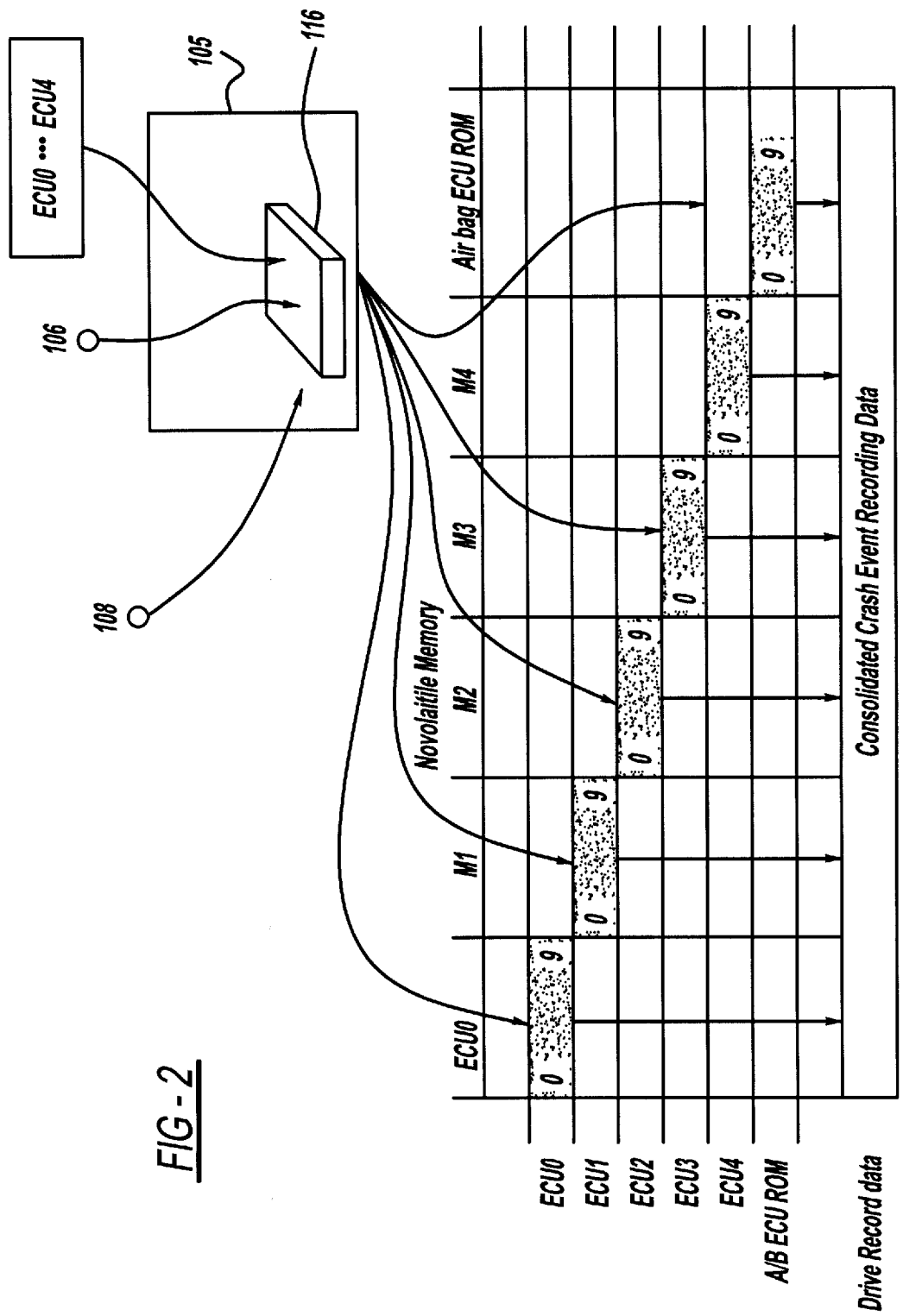
FIG. 2 is a conceptual view of an event data recording and loading system for a vehicle in accordance with the present disclosure.

FIG. 2 depicts a conceptual view of a drive record data distribution method in this embodiment. For convenience of illustration, ECUn is set to ECU4, the memory blocks are set to 0 to 9 for each of the memory devices M1-M4 depicted in FIG. 2. When the vehicle main switch is ON, the Airbag ECU105 keeps receiving vehicle drive information data from other electric control devices ECU0-ECU 4, sensors 106 and switches 108. One example of a vehicle main switch is an ignition switch.

The vehicle drive information data may be memorized (e.g. first memorized) in the air bag ECU RAM 116, and then, the data assignment device 104 (not shown in FIG. 2) assigns and distributes the vehicle drive information data to the other electric control devices ECU0-ECU4 as a fraction of drive record data. If the memory devices M1-M4 become full, the data assignment device 104 may write the drive record data to ROM 118 in the airbag ECU 105. Airbag ECU 105 may continue receiving vehicle drive information data and distributing the same until the main switch of the vehicle is turned off or an unusual state such as an accident or collision of the vehicle is detected. The unusual state may be detected by the sensors 106, the airbag ECU 105 or the other electric control devices ECU0-ECU 4. In case of a secondary accident, event data recorder 112 may keep recording the drive record predetermined time period data after the detection of the first accident.

Figure 3:
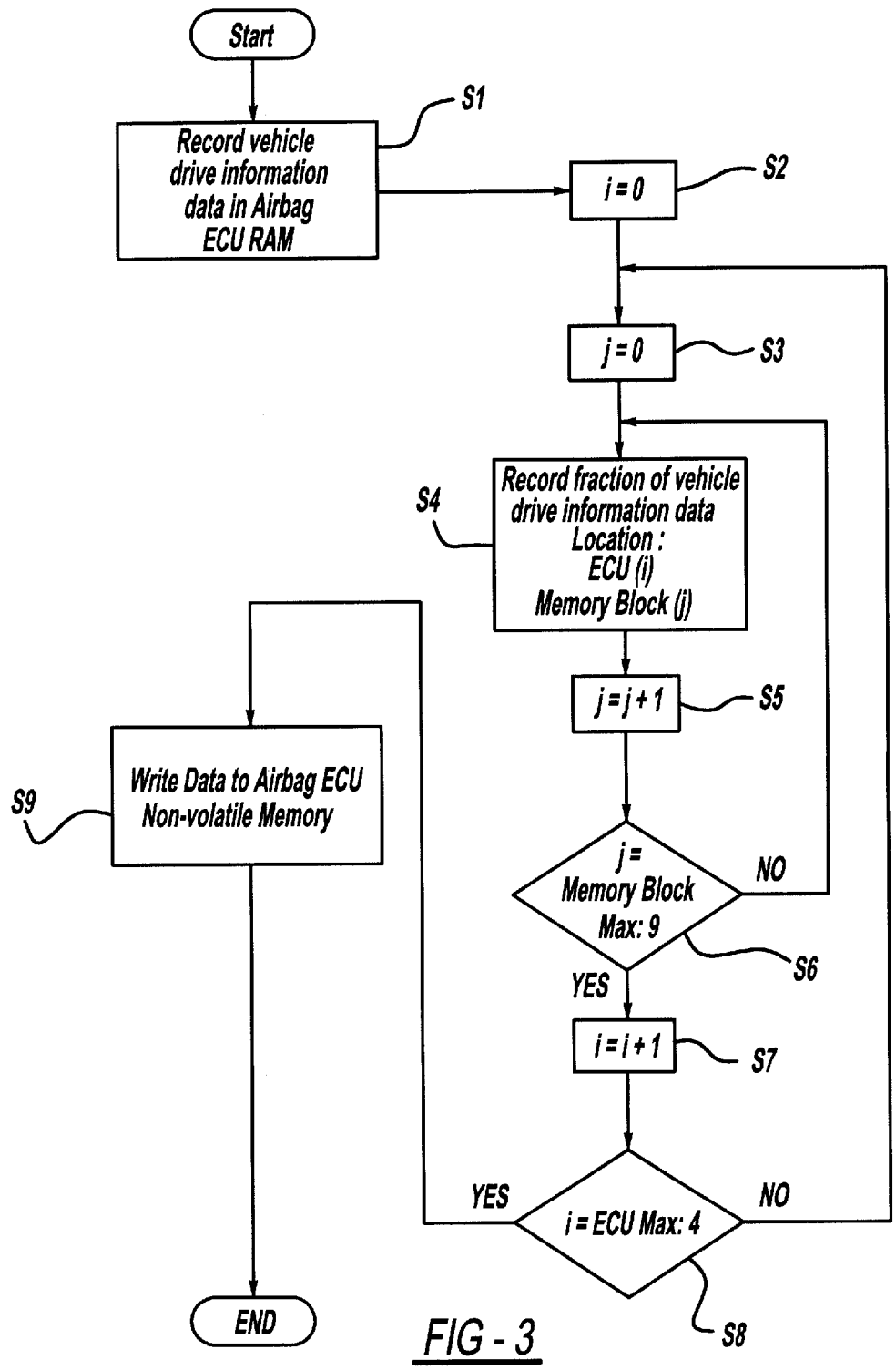
FIG. 3 is a flowchart depicting a memorization procedure of a event data recording and loading system for a vehicle in accordance with the present disclosure.

Turning to FIG. 3, a flow chart depicts a memorization procedure of an event data recording and loading system, such as for a vehicle depicted in FIG. 2. Step S1 may entail storing the vehicle drive information data in the airbag ECU RAM 116. The procedure may continue to step S2, where setting parameter (i) to 0 may occur. Parameter (i) may indicate which electric control device may be used for storing the drive record data among the electric control devices ECU0-ECU4. Step S3 may entail setting the parameter (j) to 0. Parameter (j) may indicate which memory blocks may be used to store the drive record data among the memory blocks 0-9 of memory devices M(i) in ECU(i).

Continuing with FIG. 3, step S4 may entail recording a fraction of vehicle drive information data to memory block (j) in memory device (i) of ECU (i). Next, Step S5 may entail incrementing parameter (j) by +1. That is, if (j) is 0, (j) will become 1. Step S6 involves determining if parameter (j) is equal to the maximum number of 9. If (j) does not reach the maximum number 9, steps S4 and S5 are repeated until (j) reaches the maximum number of 9. If (j) reaches the maximum number of 9, the process continues on to step S7. At step S7, incrementing the parameter (i) by +1 is accomplished. That is, if (i) is 0, the (i) will become 1. In step S8, the process determines if the parameter (i) is equal to the maximum number of 4. If (i) has not reached the maximum number of 4, the process repeats step S3 to step S7 until (i) reaches the maximum number 4. If (i) reaches the maximum number 4, the process continues on to step S9, which entails recording a fraction of vehicle drive information data to the ROM 105 of the airbag ECU 105.

With the above-described structure and process/method, if one tried to alter the recorded data, one would have to detect which electric control device ECU 0-ECU 4 or ROM 118 of airbag ECU 105 stores the specific data which one intends to alter, or to set all of the electric control devices ECU 0-ECU 4 and the airbag ECU 105 available to access (i.e. an access mode), and input completely new accident data; not only the data intended to be altered, but also data which is not intended to be altered via the data assignment device 104.

Generally, either the detection of the specific data location or the input of the whole disguised accident data (e.g. input of entirely new but inaccurate accident data) would be very difficult for an ordinary person. Thus, altering the drive record data is much more difficult relative to a conventional EDR, which stores whole event data in one memory device (i.e. only one memory device).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. An event data recorder for a vehicle comprising:
    a plurality of electric controllers each having a separate memory device, the plurality of electric controllers each playing a respective role in the vehicle, and
    a data assignment device connected to each of said plurality of electric controllers, wherein,
        the data assignment device assigns a first distinct portion of drive record data which is less than all of the drive record data to be recorded on the memory device of a first one of the plurality of electric controllers to store the first distinct portion of the drive record data, and
        the data assignment device assigns the rest of the drive record data to the memory devices of the rest of the plurality of electric controllers to store the rest of the drive record data,
        wherein less than an entirety of the memory device of the first one of the plurality of electric controllers includes the first distinct portion of drive record data.

2. The event data recorder for a vehicle according to claim 1, wherein the drive record data are converted into mathematical data when stored in the electrical controllers.

3. The event data recorder for a vehicle according to claim 1, wherein the plurality of electric controllers are disposed in different positions in the vehicle.

4. The event data recorder for a vehicle according to claim 1, wherein the memory device of the plurality of electric controllers is a non-volatile memory.

5. An event data recording and loading system for a vehicle, comprising:
    a plurality of electric controllers each having a separate memory device, the plurality of electric controllers each playing a respective role in the vehicle;
    a data assignment device connected to each of said plurality of electric controllers, and
    a data loading device enabled to communicate with the data assignment device, wherein:
        the data assignment device assigns a first distinct portion of drive record data which is less than all of the drive record data to be recorded on the memory device of a first one of the plurality of electric controllers to store the first distinct portion of the drive record data,
        the data assignment device assigns the rest of the drive record data to the memory devices of the rest of the plurality of electric controllers to store the rest of the drive record data, and
        the data loading device collects fractions of the drive record data from the memory devices of the plurality of the electric controllers and combines said fractions to restore the drive record data,
        wherein less than an entirety of the memory device of the first one of the plurality of electric controllers includes the first distinct portion of drive record data.

6. The event data recording and loading system for a vehicle according to claim 5, wherein:
    the drive record data are converted into mathematical data when stored in the electrical controllers, and
    the data loading device converts the mathematical data into available drive record data.

7. The event data recording and loading system for a vehicle according to claim 5, wherein:
    the plurality of electric controllers are disposed in different positions in the vehicle, and
    the data loading device is a portable device.

8. The event data recording and loading system for a vehicle according to claim 5, wherein:
    the memory device of the plurality of electric controllers is a non-volatile memory.

9. An event data recording and loading system for a vehicle, comprising:
- a plurality of electric controllers disposed in different positions in the vehicle, the plurality of electric controllers each having a separate non-volatile memory device, the plurality of electric controllers each playing a respective role in the vehicle;
- a data assignment device connected to each of said plurality of electric controllers, and
- a data loading device enabled to communicate with the data assignment device, wherein:
  - the data assignment device assigns a first distinct portion of drive record data which is less than all of the drive record data to be recorded on the memory device of a first one of the plurality of electric controllers to store the first distinct portion of the drive record data,
  - the data assignment device assigns the rest of the drive record data to the memory devices of the rest of the plurality of electric controllers to store the rest of the drive record data, and
  - the data loading device is a portable device and collects fractions of the drive record data from the memory devices of the plurality of the electric controllers and combines said fractions to restore the drive record data,
  - wherein less than an entirety of the memory device of the first one of the plurality of electric controllers includes the first distinct portion of drive record data.

10. The event data recording and loading system for a vehicle according to claim 9, wherein:
- the drive record data are converted into mathematical data when stored in the electrical controllers, and
- the data loading device converts the mathematical data into available drive record data.

11. The event data recorder for a vehicle according to claim 1, wherein the data assignment device assigns a second distinct portion of the drive record data, which is less than all of the drive record data, and which is different than the first distinct portion, to a second one of the plurality of electric controllers different than the first one of the plurality of electric controllers to store the second distinct portion of the drive record data.

12. The event data recording and loading system for a vehicle according to claim 5, wherein the data assignment device assigns a second distinct portion of the drive record data, which is less than all of the drive record data, and which is different than the first distinct portion, to a second one of the plurality of electric controllers different than the first one of the plurality of electric controllers to store the second distinct portion of the drive record data.

13. The event data recording and loading system for a vehicle according to claim 9, wherein the data assignment device assigns a second distinct portion of the drive record data, which is less than all of the drive record data, and which is different than the first distinct portion, to a second one of the plurality of electric controllers different than the first one of the plurality of electric controllers to store the second distinct portion of the drive record data.

14. The event data recorder for a vehicle according to claim 1, wherein the drive record data is related to a single event.

15. The event data recording and loading system for a vehicle according to claim 5, wherein the drive record data is related to a single event.

16. The event data recording and loading system for a vehicle according to claim 9, wherein the drive record data is related to a single event.

17. The event data recorder for a vehicle according to claim 1, wherein event data recorder records the drive record data of a first event and records drive record data of a second event different than the first event.

18. The event data recording and loading system for a vehicle according to claim 5, wherein event data recorder records the drive record data of a first event and records drive record data of a second event different than the first event.

19. The event data recording and loading system for a vehicle according to claim 9, wherein event data recorder records the drive record data of a first event and records drive record data of a second event different than the first event.

* * * * *